2 Sheets—Sheet 1.

P. DILLON & J. CLEARY,

Assignors of one-third interest to G. H. Bradford.

SOLDERING-MACHINE.

No. 7,901. Reissued Oct. 2, 1877.

Witnesses:
T. C. Brecht
C. M. Connell

Inventor:
Peter Dillon & John Cleary
by
Blanchard & Singleton
Attys.

2 Sheets—Sheet 2.

P. DILLON & J. CLEARY,

Assignors of one-third interest to G. H. Bradford.

SOLDERING-MACHINE.

No. 7,901. Reissued Oct. 2, 1877.

Witnesses:

T. C. Brecht

C. M. Connell

Inventors:

Peter Dillon & John Cleary by

Blanchard & Singleton

Att'ys.

UNITED STATES PATENT OFFICE.

PETER DILLON AND JOHN CLEARY, OF SHERBROOKE, QUEBEC, CANADA, ASSIGNORS OF ONE-THIRD INTEREST TO GEORGE H. BRADFORD.

IMPROVEMENT IN SOLDERING-MACHINES.

Specification forming part of Letters Patent No. 186,813, dated January 30, 1877; Reissue No. 7,901, dated October 2, 1877; application filed June 23, 1877.

*To all whom it may concern:*

Be it known that we, PETER DILLON and JOHN CLEARY, of Sherbrooke, in the Province of Quebec and Dominion of Canada, have invented certain new and useful Improvements in Soldering-Machines; and we do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 4:
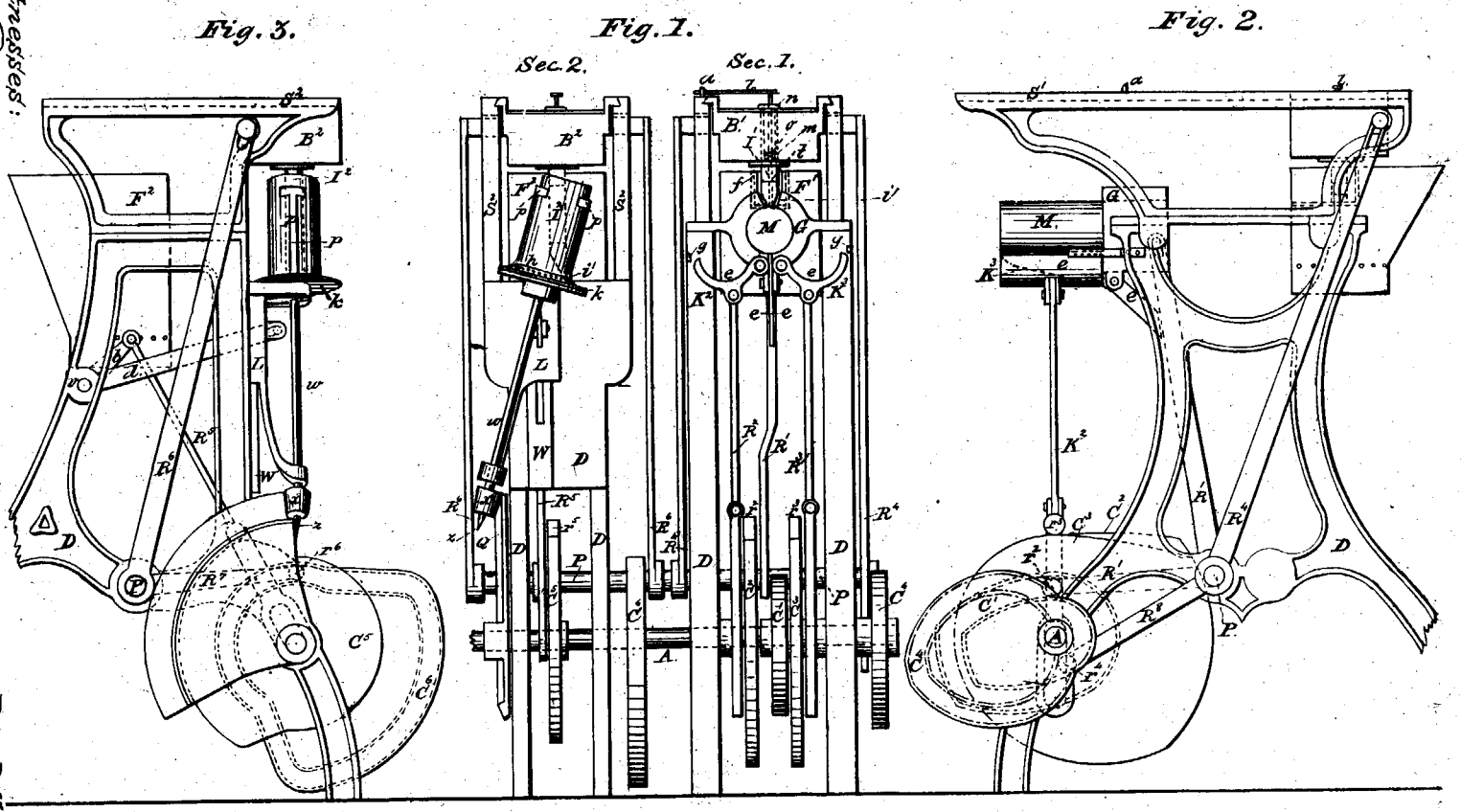
Figure 4:
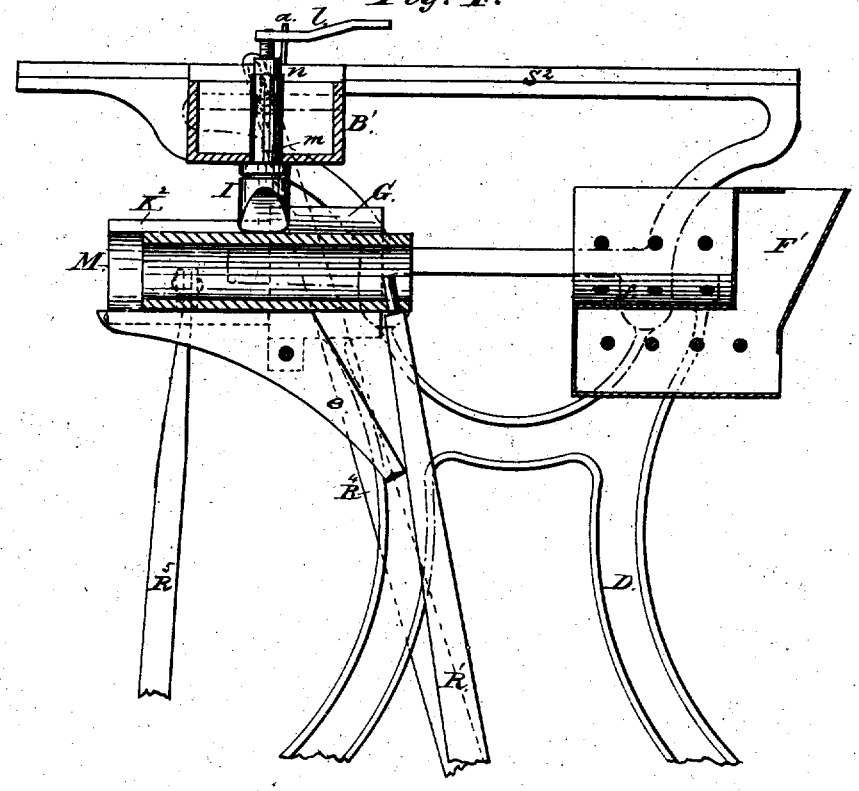
Figure 5:
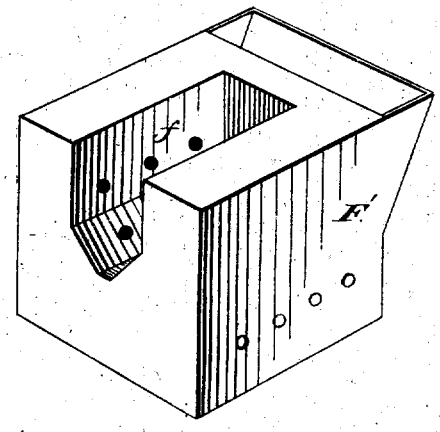

Figure 1 is a front elevation of the entire machine. Fig. 2 is a side elevation of section 1, which comprises the cylinder-forming mechanism. Fig. 3 is a side elevation of section 2, which comprises the mechanism for attaching the bottoms to the cylinders. Fig. 4 is a vertical section through Fig. 2, and Fig. 5 is a perspective view of the furnace and perforated guard.

This invention relates to an improvement in that class of machines in which solder is supplied to the soldering-tool intermittently, and the discharge regulated automatically by a cock, or equivalent adjustable device.

The improvement also relates to the construction and arrangement of parts, as hereinafter described and claimed.

D D D D represent the frames, which constitute the body of the machine. A is the main shaft, to which are attached the various cams $C^1$ $C^2$ $C^3$ $C^4$ $C^5$ $C^6$, which, respectively, communicate motion to the various parts—viz., the cam $C^1$, by means of the roller $r^1$ on the rocker-arm $R^1$ $R^1$, which moves freely on the spindle P, and communicates a forward and backward movement to the mold M, which slides freely but accurately through the slotted guideway G. The cams $C^2$ and $C^3$, by means of the rollers $r^2$ and $r^3$ on the connecting-rods $R^2$ and $R^3$, raise or lower the clips $K^2$ and $K^3$, as required. The cam $C^4$, by means of the roller $r^4$ and the levers $R^3$, $R^4$, and $R^4$, each of which levers is firmly keyed to the spindle P, communicates a forward and backward movement to the soldering apparatus $B^1$ $I^1$, as required.

In a similar manner the soldering apparatus $B^2$ $I^2$ is operated by the cam $C^6$. The cam $C^5$, by means of the roller $r^5$, connecting-rod $R^5$, and combined levers $b$ and $d$, communicates an upward and downward movement to the sliding bracket L, which carries the spindle $w$, to one end of which is attached the friction-roller $x$, and to the other a holder, $h$, and plate $k$, fitted together by means of a sliding key or feather, so that the holder $h$ and spindle $w$ can move up or down through, but cannot rotate without also revolving the plate $k$, to which are attached the spring arms or clips $p$ and $p$, for the purpose of holding the cylinder and bottom in position during the soldering process.

Q is a beveled friction-sector, for the purpose of imparting, by means of the friction-pulley $x$, a rotary motion to the spindle $w$ and its fittings.

The soldering apparatus consists, alike in each section, of a bath, $B^1$ for the purpose of containing a convenient quantity of molten solder, to which bath is attached, internally, a valve, $o$, so constructed that when in its normal position the chamber $m$ is in communication with the interior of the bath, and receives a charge of its contents; but as soon as the lever $l$ is moved backward that communication is broken, and another effected with the guide or tube $t$ in connection with the point $i'$ of the soldering-iron $I^1$, which is also attached externally to the lower part of the bath $B^1$.

The capacity of the chamber $m$ is regulated by turning the nut $n$, so as to raise or lower the valve, as desired.

Attached to the frames D D D D are the guides $S^1$ $S^1$ $S^2$ $S^2$, for the purpose of guiding the soldering apparatus to its working position when required.

$F^1$ $F^2$ are furnaces, also substantially alike in each section, each provided with a perforated guard, $f$, so placed within the furnaces as to prevent the adhesion of dust or cinders to the soldering-irons while being heated. The furnaces are so placed below the baths as to keep the irons perfectly heated, and to keep the solder contained in the baths and valves in a molten state.

The action of section 1 of the machine is as follows: The plate of metal, already cut to the required size, is placed between the gages *g g*, when the mold M is brought forward by the action of cam $C^1$, in effecting which the upper part of the connecting-rod $R^1$ strikes the dog *e e*, causing it to gripe the plate of metal against the mold M. The clips $K^2$ and $K^3$, by the action of the cams $C^2$ and $C^3$, are then raised, so as to hold the plate of metal firmly and closely about the mold M. The cam $C^2$, having a slight amount of lead over the cam $C^3$, causes the clip $K^2$ to be in position before the clip $K^3$, so allowing the one edge of the plate of metal to overlap the other, for the purpose of insuring a more perfect joint upon the application of the solder. By the time the plate is pressed around the mold, as described, the soldering apparatus, by the action of the cam $C^4$, has advanced as far as the inner edge of the plate of metal, so that the lever *l* strikes the stud *a*, thereby opening communication between the chamber *m* and the point *i'* of the soldering-iron $I^1$, so allowing the charge of solder contained by the chamber *m* to be deposited along the overlapped edges of the plate of metal as the soldering-iron passes over it.

When the soldering apparatus has traversed and deposited solder along the entire seam, it immediately makes a backward movement, still pressing its heated point against the seam, to insure the perfect soldering of the edges, and returns to the furnace $F^1$, where it is reheated. At a short interval after the soldering apparatus has completed the seam the clips $K^2$ and $K^3$ are lowered by the action of the cams $C^2$ and $C^3$, the mold *m* and dog *e e* are withdrawn, and the completed cylinder released, ready to be taken to section 2 for the purpose of having *x* bottom affixed to it, which is accomplished as follows: The sliding bracket L being at the lower end of the slide W, the metal cylinder taken from section 1 is pressed within the upturned edges of a disk of metal already punched to form the bottom of the can, and the two pieces, thus temporarily united, are placed bottom downward in the holder *h*, and held in position by the spring-clips *p p*. The soldering apparatus $B^2$ $I^2$ is then brought forward by the action of the cam $C^6$, and the sliding bracket L is immediately afterward raised by the action of the cam $C^5$, so that the point of the soldering-iron $I^2$ shall be in the position within the cam, as shown by the dotted lines $I^2$, section 2, Fig. 1, in effecting which the valve of the soldering apparatus is opened similarly to the manner described in the action of section 1, and at the same time the beveled sector Q, by means of the friction-pulley *x*, imparts a rotary motion to the holder *h*, causing the charge of solder to be evenly distributed around the seam; which being completed, the sector Q ceases to rotate the holder *h*, the sliding bracket is allowed by the cam $C^5$ to descend, the soldering apparatus, by the action of cam $C^6$, returns to the furnace $F^2$ to be reheated, and the point *z* of the spindle *w* strikes the main shaft A, and presses the holder *h* inwardly against the springs *p p*, allowing the finished can to be withdrawn and replaced by another cylinder and bottom, when the entire operation last described is repeated.

Having thus described our invention, what we claim, and desire to secure by Letters Patent, is—

1. In combination with a furnace and soldering-bath, $B^1$, the vertically-placed soldering-bolt $I^1$, having an intermittent reciprocating movement, together with the bath, in a horizontal direction, and consisting of centrally-perforated copper point *i'*, the connected tube *t*, and the valve *o*, with arm *l* and the lug *a*, substantially as shown and described, for the purpose specified.

2. The combination of the rising and falling and intermittently-rotated holder *h*, set at an inclination, as described, the traveling bath $B^2$, and the hollow bevel-pointed soldering-tube $I^2$, substantially as shown and described.

3. In combination with the soldering apparatus $B^1$ $I^1$, the sliding mold M, dog *e e*, and clips $K^2$ $K^3$, with their operating mechanism, substantially as and for the purpose specified.

4. The reciprocating bath $B^1$, having within it a hollow soldering-bolt, $I^1$, intermittently opened and closed, by which reciprocating movement of the bath longitudinal seams have the solder deposited along them and smoothed by the bolt on its return.

5. The combination of the reciprocating bath $B^1$ and attached soldering-iron with a stationary furnace, whereby the bath and iron are heated at each return to the furnace.

6. A hollow soldering-bolt having a beveled end, in combination with the correspondingly-beveled clips $K^2$ $K^3$, substantially as and for the purpose described.

7. The combination of the stop *a*, lever *l*, valve *o*, and chamber *m*, substantially as and for the purpose described.

8. The combination of the friction beveled sector Q, friction-pulley *x* on the spindle *w*, and the cam $C^5$, connecting-rod $R^5$, and levers *b* and *d*, whereby the table is elevated and depressed and a rotary motion given to it, substantially as and for the purpose set forth.

In testimony that we claim the foregoing we have hereunto set our hands this 14th day of May, 1877.

PETER DILLON.
JOHN CLEARY.

Witnesses:
E. PELLEW FELTON,
F. A. JONES.